(12) United States Patent
Sunku et al.

(10) Patent No.: US 11,494,212 B2
(45) Date of Patent: Nov. 8, 2022

(54) TECHNOLOGIES FOR ADAPTIVE PLATFORM RESOURCE ASSIGNMENT

(71) Applicant: Intel Corporation, Santa Clara, CA (US)

(72) Inventors: Ranganath Sunku, Hillsboro, OR (US); Dinesh Kumar, Portland, OR (US); Irene Liew, Gilbert, AZ (US); Kavindya Deegala, Portland, OR (US); Sravanthi Tangeda, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 743 days.

(21) Appl. No.: 16/144,388

(22) Filed: Sep. 27, 2018

(65) Prior Publication Data

US 2019/0042298 A1 Feb. 7, 2019

(51) Int. Cl.
*G06F 9/455* (2018.01)
*G06F 9/50* (2006.01)
(Continued)

(52) U.S. Cl.
CPC ........ *G06F 9/45558* (2013.01); *G06F 9/5027* (2013.01); *G06F 9/5077* (2013.01); (Continued)

(58) Field of Classification Search
CPC .. G06F 9/45558; G06F 9/5027; G06F 9/5077; G06F 2009/4557;
(Continued)

(56) References Cited

U.S. PATENT DOCUMENTS 6,937,574 B1 * 8/2005 Delaney ............... H04L 49/354
370/254
8,798,080 B2 * 8/2014 Leu ......................... H04L 49/70
370/400
(Continued)

FOREIGN PATENT DOCUMENTS

CN 107135134 A * 9/2017 ......... H04L 12/4641
CN 108471397 A * 8/2018 ......... G06F 9/45558
(Continued)

*Primary Examiner* — David R Lazaro
*Assistant Examiner* — Berhanu Shitayewoldetadik
(74) *Attorney, Agent, or Firm* — Compass IP Law PC

(57) ABSTRACT

Technologies for adaptive platform resource management include a compute node to manage a processor core mapping scheme between virtual machines (VMs) and a virtual switch of the compute node via a set of virtual ports. The virtual switch is also coupled to a network interface controller (NIC) of the compute node via another set of virtual ports. Each of the VMs is configured to either provide ingress or egress to the NIC or provide ingress/egress across the VMs, via the virtual ports. The virtual ports for providing ingress or egress to the NIC are pinned to a same processor core of a processor of the compute node, and each of the virtual ports for providing ingress and/or egress across the VMs are pinned to a respective processor core of the processor such that data is transferred across VMs by coupled virtual ports that are pinned to the same processor core.

24 Claims, 4 Drawing Sheets

(51) Int. Cl.
  *H04L 12/931* (2013.01)
  *G06F 15/16* (2006.01)
  *H04L 15/16* (2006.01)
  *H04L 49/00* (2022.01)
  *H04L 41/0823* (2022.01)
  *H04L 12/70* (2013.01)

(52) U.S. Cl.
  CPC .......... *H04L 41/0823* (2013.01); *H04L 49/70* (2013.01); *G06F 2009/4557* (2013.01); *G06F 2009/45595* (2013.01); *H04L 2012/5631* (2013.01)

(58) Field of Classification Search
  CPC ....... G06F 2009/45595; H04L 41/0823; H04L 49/70; H04L 2012/5631
  USPC ....................................................... 709/226
  See application file for complete search history.

(56) References Cited

U.S. PATENT DOCUMENTS

| | | | |
|---|---|---|---|
| 9,612,857 B2* | 4/2017 | Archer | H04L 67/10 |
| 9,921,866 B2* | 3/2018 | Ganguli | G06F 9/5072 |
| 10,409,704 B1* | 9/2019 | Sahota | G06F 9/44505 |
| 10,911,397 B2* | 2/2021 | Chandrashekhar | H04L 45/586 |
| 10,999,165 B2* | 5/2021 | Cidon | H04L 12/4641 |
| 11,356,388 B2* | 6/2022 | Schubert | H04L 49/552 |
| 2006/0018329 A1* | 1/2006 | Nielsen | H04L 49/254 370/401 |
| 2006/0095913 A1* | 5/2006 | Bodas | G06F 9/5094 718/100 |
| 2008/0008202 A1* | 1/2008 | Terrell | H04L 45/586 370/401 |
| 2008/0159277 A1* | 7/2008 | Vobbilisetty | H04L 67/1097 370/357 |
| 2008/0177424 A1* | 7/2008 | Wheeler | G06F 9/5077 700/295 |
| 2010/0037038 A1* | 2/2010 | Bieswanger | G06F 9/5094 713/300 |
| 2010/0061242 A1* | 3/2010 | Sindhu | H04L 49/30 370/235 |
| 2010/0061389 A1* | 3/2010 | Sindhu | H04L 49/70 370/412 |
| 2011/0103259 A1* | 5/2011 | Aybay | H04L 41/0806 370/254 |
| 2011/0194404 A1* | 8/2011 | Kluger | H04L 45/68 370/395.53 |
| 2011/0235645 A1* | 9/2011 | Sardar | H04L 67/1097 370/395.53 |
| 2012/0084487 A1* | 4/2012 | Barde | G06F 9/45541 718/1 |
| 2012/0120964 A1* | 5/2012 | Koponen | H04L 41/0813 370/409 |
| 2012/0147898 A1* | 6/2012 | Koponen | H04L 47/50 370/422 |
| 2012/0204186 A1* | 8/2012 | Davidson, II | G06F 9/4881 718/104 |
| 2012/0287936 A1* | 11/2012 | Biswas | H04L 12/4641 370/395.3 |
| 2013/0128885 A1* | 5/2013 | Kardashov | H04L 12/56 370/389 |
| 2014/0185611 A1* | 7/2014 | Lie | H04L 45/34 370/355 |
| 2014/0201733 A1* | 7/2014 | Benny | G06F 9/45558 718/1 |
| 2014/0241353 A1* | 8/2014 | Zhang | H04L 45/74 370/392 |
| 2014/0310495 A1* | 10/2014 | Michelogiannakis | G06F 13/1626 711/167 |
| 2015/0180769 A1* | 6/2015 | Wang | H04L 45/38 370/236 |
| 2015/0244617 A1* | 8/2015 | Nakil | H04L 41/0895 709/224 |
| 2015/0281090 A1* | 10/2015 | Wu | H04L 45/24 370/235 |
| 2015/0319088 A1* | 11/2015 | Wenig | H04L 49/70 370/392 |
| 2015/0331715 A1* | 11/2015 | Sathyanarayana | H04L 67/10 718/1 |
| 2015/0334045 A1* | 11/2015 | Tremblay | H04L 47/783 709/226 |
| 2015/0370586 A1* | 12/2015 | Cooper | G06F 9/45533 718/1 |
| 2015/0378762 A1* | 12/2015 | Saladi | H04L 41/0895 718/1 |
| 2016/0036732 A1* | 2/2016 | Lu | H04L 69/161 370/235 |
| 2016/0179560 A1* | 6/2016 | Ganguli | G06F 9/5072 718/1 |
| 2016/0252943 A1* | 9/2016 | Varma | G06F 9/5094 713/310 |
| 2016/0255045 A1* | 9/2016 | Kolesnik | H04L 12/4641 709/222 |
| 2017/0078168 A1* | 3/2017 | Harris, Jr. | G06F 9/45558 |
| 2017/0078198 A1* | 3/2017 | Nellikar | G06F 9/45558 |
| 2017/0199798 A1* | 7/2017 | Jain | G06F 11/3024 |
| 2017/0208487 A1* | 7/2017 | Ratakonda | H04L 43/18 |
| 2017/0214613 A1* | 7/2017 | Zhang | H04L 45/74 |
| 2017/0262299 A1* | 9/2017 | Chow | G06F 9/45545 |
| 2017/0269668 A1* | 9/2017 | Min | G06F 9/45558 |
| 2017/0329635 A1* | 11/2017 | Rathke | G06F 30/20 |
| 2017/0371698 A1* | 12/2017 | Paolino | H04L 49/70 |
| 2018/0019948 A1* | 1/2018 | Patwardhan | H04L 47/125 |
| 2018/0027309 A1* | 1/2018 | Friel | H04Q 9/00 340/870.01 |
| 2018/0083837 A1* | 3/2018 | Teng | H04L 41/40 |
| 2018/0091415 A1* | 3/2018 | Chanda | H04L 45/38 |
| 2018/0091444 A1* | 3/2018 | Sindhu | H04L 49/70 |
| 2018/0109471 A1* | 4/2018 | Chang | H04L 49/70 |
| 2018/0157520 A1* | 6/2018 | Choi | G06F 9/45558 |
| 2018/0159723 A1* | 6/2018 | Rao | H04L 43/12 |
| 2018/0285166 A1* | 10/2018 | Roy | G06F 9/5016 |
| 2018/0359215 A1* | 12/2018 | Khare | H04L 49/70 |
| 2019/0028435 A1* | 1/2019 | Khare | H04L 63/0236 |
| 2019/0036868 A1* | 1/2019 | Chandrashekhar | H04L 45/021 |
| 2019/0158605 A1* | 5/2019 | Markuze | H04L 69/163 |
| 2019/0182117 A1* | 6/2019 | Bower, III | H04L 41/12 |
| 2019/0188001 A1* | 6/2019 | Mehra | G06F 9/4403 |
| 2019/0266107 A1* | 8/2019 | Murphy | G06F 12/1433 |
| 2019/0268421 A1* | 8/2019 | Markuze | H04L 67/10 |
| 2019/0317814 A1* | 10/2019 | Jin | G06N 20/00 |
| 2019/0332408 A1* | 10/2019 | Jiang | H04L 69/22 |
| 2020/0034075 A1* | 1/2020 | Li | G06F 3/061 |
| 2020/0036646 A1* | 1/2020 | Mathew | H04L 45/16 |
| 2020/0052955 A1* | 2/2020 | Rollins | H04L 67/08 |
| 2020/0057667 A1* | 2/2020 | Ramachandran | G06F 9/45558 |
| 2020/0092228 A1* | 3/2020 | Cai | H04L 49/201 |
| 2020/0112524 A1* | 4/2020 | Sindhu | H04L 49/70 |
| 2020/0195561 A1* | 6/2020 | Johnsen | H04L 47/32 |
| 2020/0314694 A1* | 10/2020 | Yu | H04L 69/22 |
| 2020/0412598 A1* | 12/2020 | Rao | H04L 41/046 |
| 2022/0182896 A1* | 6/2022 | Talebi Fard | H04W 36/0061 |

FOREIGN PATENT DOCUMENTS

| | | | | |
|---|---|---|---|---|
| EP | | 3382543 A1 * | 10/2018 | G06F 11/3006 |
| WO | WO-2018220426 A1 * | | 12/2018 | H04L 45/306 |

* cited by examiner

TECHNOLOGIES FOR ADAPTIVE PLATFORM RESOURCE ASSIGNMENT

BACKGROUND

Modern computing devices have become ubiquitous tools for personal, business, and social uses. As such, many modern computing devices are capable of connecting to various data networks, including the Internet, to transmit and receive data communications over the various data networks at varying rates of speed. To facilitate communications between computing devices, the data networks typically include one or more network computing devices (e.g., compute servers, storage servers, etc.) to route communications (e.g., via switches, routers, etc.) that enter/exit a network (e.g., north-south network traffic) and between network computing devices in the network (e.g., east-west network traffic). In present packet-switched network architectures, data is transmitted in the form of network packets between networked computing devices. At a high level, data is packetized into a network packet at one computing device and the resulting packet transmitted, via a transmission device (e.g., a network interface controller (NIC) of the computing device), to another computing device over a network.

Upon receipt or prior to transmission of a network packet, the computing device typically performs one or more processing operations on the network packet. Such processing is often compute intensive and/or latency sensitive. Accordingly, such computing devices typically include processors with multiple cores (e.g., processing units that each read and execute instructions, such as in separate threads) which operate on the data of the network packet. Additionally, various virtualization technologies have been employed to perform the processing operations. However, certain processing operations can be more computationally intensive, which can add latency. Furthermore, scaling can introduce additional costs of operation, particularly with a lack of understanding of optimal configurations and performance implications.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
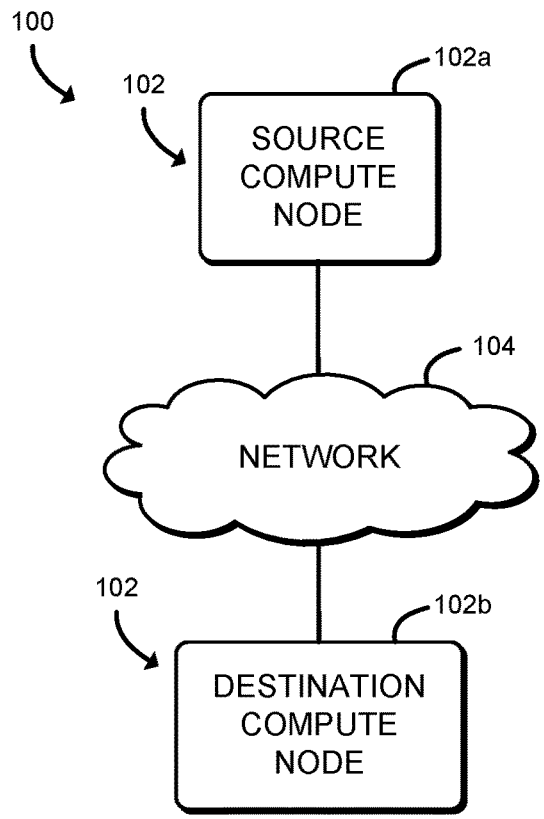
FIG. 1 is a simplified diagram of at least one embodiment of a compute node for adaptive platform resource assignment.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, a system 100 for adaptive platform resource assignment includes a source compute node 102*a* communicatively coupled to a destination compute node 102*b* via a network 104. While illustratively shown as having two compute nodes 102, the system 100 may include multiple compute nodes 102 in other embodiments. It should be appreciated that the source compute node 102*a* and the destination compute node 102*b* have been illustratively designated and described herein, as being one of a "source" of network traffic (i.e., the source compute node 102*a*) and a "destination" of the network traffic (i.e., the destination compute node 102*b*) for the purposes of providing clarity to the description. It should be further appreciated that, in some embodiments, the source compute node 102*a* and the destination compute node 102*b* may reside in the same data center or high-performance computing (HPC) environment. In other words, the source compute node 102a and the destination compute node 102b may reside in the same network 104 connected via one or more wired and/or wireless interconnects.

In an illustrative example, the source compute node 102a generates a network packet that includes data to be transmitted to and processed by the destination compute node 102b. Upon receipt of the network packet, the destination compute node 102b performs one or more processing operation on at least a portion of the data of the received network packet. Such processing operations may include network services, including, but not limited to, firewall services, network address translation (NAT) services, domain name system (DNS) services, load-balancing services, deep packet inspection (DPI) services, transmission control protocol (TCP) optimization services, cache management services, Internet Protocol (IP) address management services, etc. Further, the processing operations are typically performed by the destination compute node 102b using one or more virtualized technologies, such as one or more virtual network functions (VNFs) (e.g., executing on one or more virtual machines (VMs), in one or more containers, etc.), which can be managed by the destination compute node 102b (e.g., a VM manager, a hypervisor, an orchestrator, etc.) or a remote controller (e.g., a software defined network (SDN) controller).

In network function virtualization (NFV) architecture, a VNF is configured to handle specific network functions that run in one or more VMs or containers on top of hardware networking infrastructure traditionally carried out by proprietary, dedicated hardware, such as routers, switches, servers, cloud computing systems, etc. In other words, each VNF may be embodied as one or more VMs or containers that are configured to execute corresponding software or instructions to perform a virtualized task. It should be understood that a VM is a software program or operating system that not only exhibits the behavior of a separate computer, but is also capable of performing tasks such as running applications and programs like a separate computer. A VM, commonly referred to as a "guest," is typically configured to run a dedicated operating system on shared physical hardware resources of the device on which the VM has been deployed, commonly referred to as a "host." It should be appreciated that multiple VMs/containers can exist within a single host at a given time and that multiple VNFs may be executing on the destination compute node 102b at a time.

The destination compute node 102b is configured to manage network security at the level of VM and workloads to provide granular control of security policies related thereto, rather than at the physical network level, using microsegmentation. More particularly, microsegmentation is a technique for creating secure zones in data centers and cloud deployments that allows companies to isolate workloads from one another and secure them individually in an effort to make network security more granular. It should be appreciated that microsegmentation provides a layer of security across VMs operating on the destination compute node 102b, which allows for security policies to be exercised at virtual ports of a VM. One such implementation of microsegmentation is virtual extensible local area network (VxLAN). It should be understood that VxLAN is a network virtualization technology that attempts to address the scalability problems associated with large cloud computing deployments (e.g., by standardizing an overlay encapsulation protocol). It should be further understood that microsegmentation could be achieved through various other overlay protocols, such as Multiprotocol Label Switching (MPLS) over Generic Routing Encapsulation (GRE), etc.

It should be appreciated that VxLAN associated processing operations are often processor intensive, which can add to the latency of the network in a microsegmentation-based data plane. However, dynamic reconfiguration of the security policies using VxLAN require the VMs to adapt to VxLAN overlays and their processor core associations, often compromising on the network performance. While certain technologies, such as Intel® DPDK, can improve data plane performance, traditional approaches for scaling processors with virtual switches that use Poll Mode Driver (PMDs) constructs can lead to higher costs of operation, which can be attributable to a lack of understanding of optimal processor configurations. In other words, a lack of understanding of the scale of PMDs for better performance and its associated core pinning constructs with virtual ports could lead to a negative impact on using data plane accelerator libraries.

In use, as will be described in further detail below, the destination compute node 102b employs a virtual switch to perform network packet switching operations to facilitate the transmission of the data, or reference data related thereto, of the received network between the virtualized technologies. To address the previously noted limitations of present technologies, the destination compute node 102b provides adaptive processor assignment to PMD type constructs of the virtual switch with VMs that receive or process the encapsulated data from the virtual switch in a microsegmentation based data plane. To do so, the destination compute node 102b is configured to perform adaptive processor mapping between virtual ports of VMs that are on a VxLAN network and PMD ports on the virtual switch, based on one or more characteristics of the ingress or egress network traffic, to provide higher throughput relative to the traditional default assignment of the processor cores by the virtual switch, or orchestrator, depending on the embodiment.

Accordingly, as the scale and density of the VMs increase, the processor core sharing varies based on the processing operations, such as may be performed based on a chain of the VMs (e.g., a service function chain (SFC)) and/or characteristics of ingress/egress network traffic across the virtual ports. Furthermore, by understanding the virtual switch port telemetry and monitoring network packet flows (e.g., to determine an overall throughput of the destination compute node 102b, key performance indicators of network packet flows across an SFC, performance levels of a particular set of VMs, etc.), the destination compute node 102b is configured to apply heuristics and/or supervised learning algorithms to help remap the virtual ports to processor cores dynamically. To do so, the destination compute node 102b is configured to collect telemetry data based on Key Performance Indicators (KPIs), such as packet drops at the specific virtual ports, an amount of ingress and egress network traffic, the type/volume of network traffic flowing across VMs for a specific duration, a present/historical/expected scale of VMs, characteristics of the overlay network (e.g., the topology), a number of physical ports (e.g., of a network interface controller (NIC) of the destination compute node 102b). As such, the need for scaling the PMD cores with the VMs for performance gains can be reduced, which can result in a reduction of the total cost of operation.

While illustratively described herein as processing operations being performed on network packet ingress, it should be appreciated that one or more processing operations may also be performed on the data by the source compute node 102a prior to transmission of the network packet. As such, the source compute node 102a may be configured to employ the same or similar functionality as described herein as being performed by the destination compute node 102b upon receipt of a network packet.

The compute nodes 102 may be embodied as any type of computation or computer device capable of performing the functions described herein, including, without limitation, a computer, a server (e.g., stand-alone, rack-mounted, blade, etc.), a sled (e.g., a compute sled, an accelerator sled, a storage sled, a memory sled, etc.), an enhanced or smart NIC/HFI, a network appliance (e.g., physical or virtual), a router, switch (e.g., a disaggregated switch, a rack-mounted switch, a standalone switch, a fully managed switch, a partially managed switch, a full-duplex switch, and/or a half-duplex communication mode enabled switch), a web appliance, a distributed computing system, a processor-based system, and/or a multiprocessor system.

As shown in FIG. 1, an illustrative compute node 102 (e.g., an illustrative one of the source compute node 102a, the destination compute node 102b, etc.) is shown that includes one or more processors 200, memory 204, an I/O subsystem 206, one or more data storage devices 208, communication circuitry 210, and, in some embodiments, one or more peripheral devices 214. It should be appreciated that the compute node 102 may include other or additional components, such as those commonly found in a typical computing device (e.g., various input/output devices and/or other components), in other embodiments. Additionally, in some embodiments, one or more of the illustrative components may be incorporated in, or otherwise form a portion of, another component.

The processor(s) 200 may be embodied as any type of device or collection of devices capable of performing the various compute functions as described herein. In some embodiments, the processor(s) 200 may be embodied as one or more multi-core processors, digital signal processors (DSPs), microcontrollers, or other processor(s) or processing/controlling circuit(s). In some embodiments, the processor(s) 200 may be embodied as, include, or otherwise be coupled to an integrated circuit, an embedded system, a field-programmable-array (FPGA), a system-on-a-chip (SOC), an application specific integrated circuit (ASIC), reconfigurable hardware or hardware circuitry, or other specialized hardware to facilitate performance of the functions described herein.

The illustrative processor(s) 200 includes multiple processor cores 202 (e.g., two processor cores, four processor cores, eight processor cores, sixteen processor cores, etc.). The illustrative processor cores include a first processor core 202 designated as core (1) 202a, a second processor core 202 designated as core (2) 202b, and a third processor core 202 designated as core (N) 202c (e.g., wherein the core (N) 202c is the "Nth" processor core 202 and "N" is a positive integer). Each of processor cores 202 may be embodied as an independent logical execution unit capable of executing programmed instructions. It should be appreciated that, in some embodiments, the compute node 102 (e.g., in supercomputer embodiments) may include thousands of processor cores 202. Each of the processor(s) 200 may be connected to a physical connector, or socket, on a motherboard (not shown) of the compute node 102 that is configured to accept a single physical processor package (i.e., a multi-core physical integrated circuit). It should be appreciated that, while not illustratively shown, each of the processor cores 202 may be communicatively coupled to at least a portion of a cache memory and functional units usable to independently execute programs, operations, threads, etc.

The memory 204 may be embodied as any type of volatile or non-volatile memory or data storage capable of performing the functions described herein. In operation, the memory 204 may store various data and software used during operation of the compute node 102, such as operating systems, applications, programs, libraries, and drivers. It should be appreciated that the memory 204 may be referred to as main memory, or a primary memory. It should be understood that volatile memory may be a storage medium that requires power to maintain the state of data stored by the medium. Non-limiting examples of volatile memory may include various types of random access memory (RAM), such as dynamic random access memory (DRAM) or static random access memory (SRAM).

One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In one embodiment, the memory 204 is a block addressable memory device, such as those based on NAND or NOR technologies. A memory device may also include a three dimensional crosspoint memory device (e.g., Intel 3D XPoint™ memory), or other byte addressable write-in-place nonvolatile memory devices. In one embodiment, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product.

In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance. In some embodiments, all or a portion of the memory 204 may be integrated into the processor 200. In operation, the memory 204 may store various software and data used during operation such as workload data, hardware queue manager data, migration condition data, applications, programs, libraries, and drivers.

Each of the processor(s) 200 and the memory 204 are communicatively coupled to other components of the compute node 102 via the I/O subsystem 206, which may be embodied as circuitry and/or components to facilitate input/ output operations with the processor(s) 200, the memory 204, and other components of the compute node 102. For example, the I/O subsystem 206 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some embodiments, the I/O subsystem 206 may form a portion of a SoC and be incorporated, along with one or more of the processors 200, the memory 204, and other components of the compute node 102, on a single integrated circuit chip.

The one or more data storage devices 208 may be embodied as any type of storage device(s) configured for short-term or long-term storage of data, such as, for example, memory devices and circuits, memory cards, hard disk drives, solid-state drives, or other data storage devices. Each data storage device 208 may include a system partition that stores data and firmware code for the data storage device 208. Each data storage device 208 may also include an operating system partition that stores data files and executables for an operating system.

The communication circuitry 210 may be embodied as any communication circuit, device, or collection thereof, capable of enabling communications between the compute node 102 and other computing devices, as well as any network communication enabling devices, such as an access point, switch, router, etc., to allow communication over the network 104.

Accordingly, the communication circuitry 210 may be configured to use any one or more communication technologies (e.g., wireless or wired communication technologies) and associated protocols (e.g., Ethernet, Bluetooth®, Wi-Fi®, WiMAX, LTE, 5G, etc.) to effect such communication. It should be appreciated that, in some embodiments, the communication circuitry 210 may include specialized circuitry, hardware, or combination thereof to perform pipeline logic (e.g., hardware algorithms) for performing the functions described herein, including processing network packets (e.g., parse received network packets, determine target compute nodes for each received network packets, forward the network packets to a particular buffer queue of a respective host buffer of the compute node 102, etc.), performing computational functions, storing data, etc.

In some embodiments, performance of one or more of the functions of communication circuitry 210 as described herein may be performed by specialized circuitry, hardware, or combination thereof of the communication circuitry 210, which may be embodied as a SoC or otherwise form a portion of a SoC of the compute node 102 (e.g., incorporated on a single integrated circuit chip along with one of the processor(s) 200, the memory 204, and/or other components of the compute node 102). Alternatively, in some embodiments, the specialized circuitry, hardware, or combination thereof may be embodied as one or more discrete processing units of the compute node 102, each of which may be capable of performing one or more of the functions described herein.

The illustrative communication circuitry 210 includes the NIC 212, which may be embodied as one or more add-in-boards, daughtercards, network interface cards, controller chips, chipsets, or other devices that may be used by the compute node 102 to connect with another compute device (e.g., another compute node 102). In some embodiments, the NIC 212 may be embodied as part of a SoC that includes one or more processors, or included on a multichip package that also contains one or more processors. While not illustratively shown, it should be understood that the NIC 212 includes one or more physical ports for facilitating the ingress and egress of network traffic to/from the NIC 212. Additionally, in some embodiments, the NIC 212 may include one or more offloads/accelerators, such as a direct memory access (DMA) engine. Additionally or alternatively, in some embodiments, the NIC 212 may include a local processor (not shown) and/or a local memory (not shown) that are both local to the NIC 212. In such embodiments, the local processor of the NIC 212 may be capable of performing one or more of the functions of a processor 200 described herein. Additionally or alternatively, in such embodiments, the local memory of the NIC 212 may be integrated into one or more components of the compute node 102 at the board level, socket level, chip level, and/or other levels.

The one or more peripheral devices 214 may include any type of device that is usable to input information into the compute node 102 and/or receive information from the compute node 102. The peripheral devices 214 may be embodied as any auxiliary device usable to input information into the compute node 102, such as a keyboard, a mouse, a microphone, a barcode reader, an image scanner, etc., or output information from the compute node 102, such as a display, a speaker, graphics circuitry, a printer, a projector, etc. It should be appreciated that, in some embodiments, one or more of the peripheral devices 214 may function as both an input device and an output device (e.g., a touchscreen display, a digitizer on top of a display screen, etc.). It should be further appreciated that the types of peripheral devices 214 connected to the compute node 102 may depend on, for example, the type and/or intended use of the compute node 102. Additionally or alternatively, in some embodiments, the peripheral devices 214 may include one or more ports, such as a USB port, for example, for connecting external peripheral devices to the compute node 102. In some embodiments, the one or more peripheral devices 214 may include one or more sensors (e.g., a temperature sensor, a fan sensor, etc.).

Referring back to FIG. 1, the network 104 may be embodied as any type of wired or wireless communication network, including but not limited to a wireless local area network (WLAN), a wireless personal area network (WPAN), an edge network (e.g., a multi-access edge computing (MEC) network), a fog network, a cellular network (e.g., Global System for Mobile Communications (GSM), Long-Term Evolution (LTE), 5G, etc.), a telephony network, a digital subscriber line (DSL) network, a cable network, a local area network (LAN), a wide area network (WAN), a global network (e.g., the Internet), or any combination thereof. It should be appreciated that, in such embodiments, the network 104 may serve as a centralized network and, in some embodiments, may be communicatively coupled to another network (e.g., the Internet). Accordingly, the network 104 may include a variety of other virtual and/or physical network computing devices (e.g., routers, switches, network hubs, servers, storage devices, compute devices, etc.), as needed to facilitate communication between the source compute node 102a and the destination compute node 102b, which are not shown to preserve clarity of the description.

Figure 3:
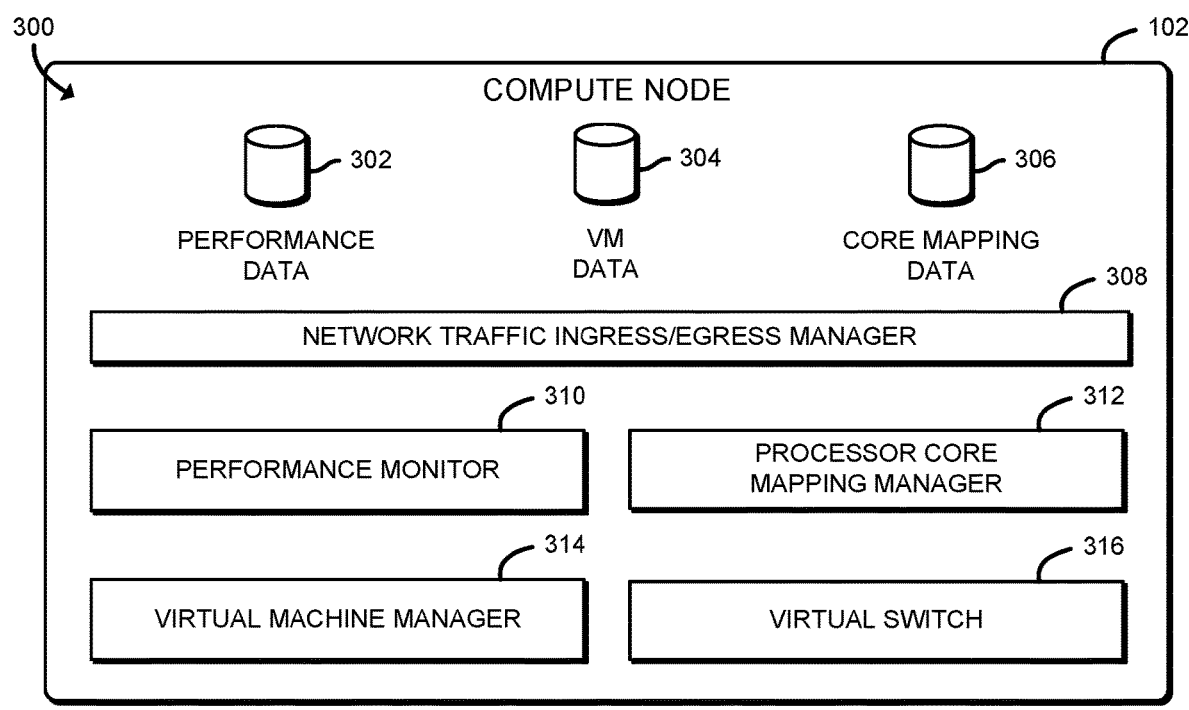
FIG. 3 is a simplified block diagram of at least one embodiment of an environment that may be established by the compute node of FIGS. 1 and 2.

Referring now to FIG. 3, the compute node 102 may establish an environment 300 during operation. The illustrative environment 300 includes a network traffic ingress/ egress manager 308, a performance monitor 310, a processor core mapping manager 312, a virtual machine manager 314, and a virtual switch 316. The various components of the environment 300 may be embodied as hardware, firmware, software, or a combination thereof. As such, in some embodiments, one or more of the components of the environment 300 may be embodied as circuitry or a collection of electrical devices (e.g., network traffic ingress/egress management circuitry 308, performance monitoring circuitry 310, processor core mapping management circuitry 312, virtual machine management circuitry 314, virtual switch circuitry 316, etc.). It should be appreciated that, in such embodiments, one or more of the network traffic ingress/egress management circuitry 308, the performance monitoring circuitry 310, the processor core mapping management circuitry 312, the virtual machine management circuitry 314, and the virtual switch circuitry 316 may form a portion of one or more of the processor(s) 200, the memory 204, the communication circuitry 210, the I/O subsystem 206 and/or other components of the compute node 102.

It should be further appreciated that, in other embodiments, one or more functions described herein as being performed by a particular component of the compute node 102 may be performed, at least in part, by one or more other components of the compute node 102, such as the one or more processors 200, the I/O subsystem 206, the communication circuitry 210, an ASIC, a programmable circuit such as an FPGA, and/or other components of the compute node 102. It should be further appreciated that associated instructions may be stored in the memory 204, the data storage device(s) 208, and/or other data storage location, which may be executed by one of the processors 200 and/or other computational processor of the compute node 102.

Figure 2:
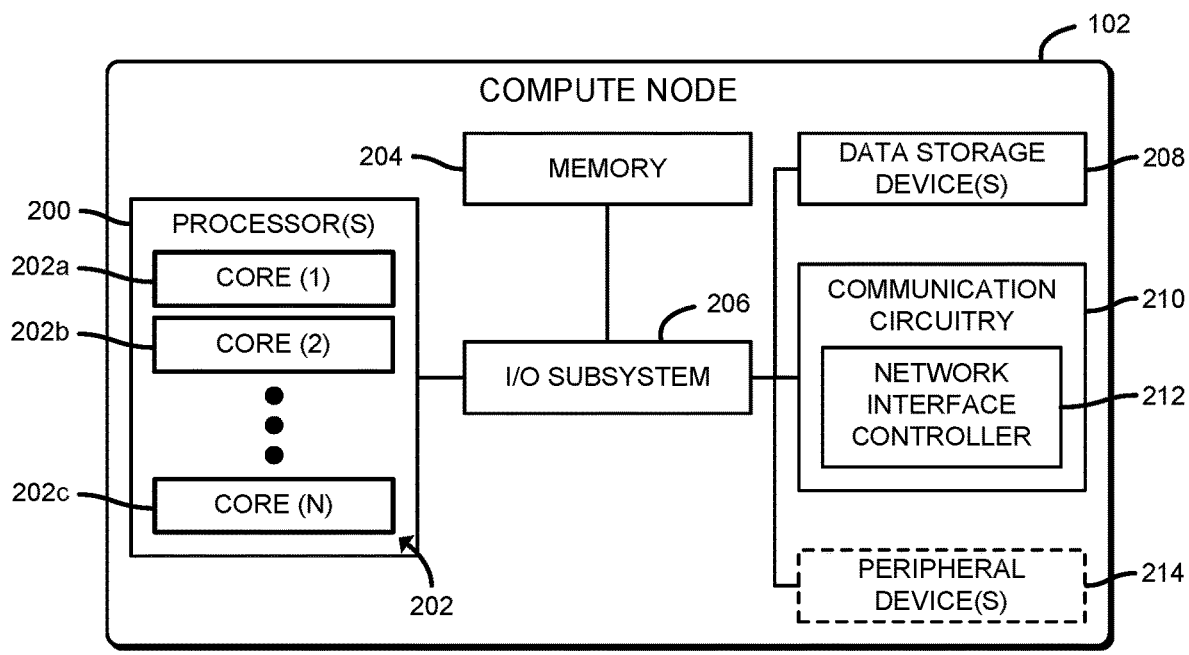
FIG. 2 is a simplified block diagram of at least one embodiment of a compute node of the system of FIG. 1.

Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the NIC 212, the processor(s) 200, or other components of the compute node 102. It should be appreciated that the compute node 102 may include other components, sub-components, modules, sub-modules, logic, sub-logic, and/or devices commonly found in a computing device, which are not illustrated in FIG. 2 for clarity of the description.

In the illustrative embodiment, the environment 300 includes performance data 302, VM data 304, and core mapping data 306, each of which may be accessed by the various components and/or sub-components of the compute node 102. Additionally, it should be appreciated that in some embodiments the data stored in, or otherwise represented by, each of the performance data 302, the VM data 304, and the core mapping data 306 may not be mutually exclusive relative to each other. For example, in some implementations, data stored in the performance data 302 may also be stored as a portion of the VM data 304 and/or the core mapping data 306. As such, although the various data utilized by the compute node 102 is described herein as particular discrete data, such data may be combined, aggregated, and/or otherwise form portions of a single or multiple data sets, including duplicative copies, in other embodiments.

The network traffic ingress/egress manager 308, which may be embodied as hardware, firmware, software, virtualized hardware, emulated architecture, and/or a combination thereof as discussed above, is configured to receive inbound and route/transmit outbound network traffic. To do so, the network traffic ingress/egress manager 308 is configured to facilitate inbound/outbound network communications (e.g., network traffic, network packets, network flows, etc.) to and from the compute node 102. For example, the network traffic ingress/egress manager 308 is configured to manage (e.g., create, modify, delete, etc.) connections to physical and virtual network ports (i.e., virtual network interfaces) of the compute node 102 (e.g., via the communication circuitry 210), as well as the ingress/egress buffers/queues associated therewith.

The performance monitor 310, which may be embodied as hardware, firmware, software, virtualized hardware, emulated architecture, and/or a combination thereof as discussed above, is configured to monitor performance metrics of one or more physical and/or virtual resources of the compute node 102. For example, the performance monitor 310 may be configured to monitor hardware resource utilization rates of processor cores (e.g., the processor cores 202 of FIG. 2), utilization rates of memory (e.g., the memory 204 of FIG. 2), etc., as well as other hardware resource performance metrics. In another example, the performance monitor 310 may be configured to monitor metrics associated with the virtual switch, as well as other virtual switch performance influencing characteristics, such as the number of active PMD threads, network packet counts at virtual ports for each VM, network packet drops, information discernible from sampling flows from the vSwitch (e.g., similar to those described above for the network traffic ingress/egress manager 308), a day of the year/month/week, a time of day, etc.

The performance monitor 310 is further configured to analyze at least a portion of the ingress/egress network traffic to identify one or more network traffic characteristics. To do so, the performance monitor 310 is configured to sample portions of the network traffic to determine various network traffic characteristics. For example, the performance monitor 310 may be configured to analyze sample portions of the ingress/egress network traffic to determine network traffic patterns, an amount of dropped network packets, a network traffic volume, network traffic workload types, network traffic distribution metrics, etc. In some embodiments, the network traffic characteristics and/or the performance metrics may be stored in the performance data 302. As such, the performance monitor 310 can determine various performance metrics, such as an overall throughput of the compute node 102, key performance indicators of network packet flows across an SFC, performance levels of a particular set of VMs, etc.

The processor core mapping manager 312, which may be embodied as hardware, firmware, software, virtualized hardware, emulated architecture, and/or a combination thereof as discussed above, is configured to analyze one or more network traffic characteristics (e.g., as determined by the network traffic ingress/egress manager 308) across the VxLAN network identifiers that are configured at run time for microsegmentation (e.g., by an orchestrator, a remote controller, etc.). To do so, as certain processing operations are performed (e.g., network packet encapsulations and decapsulations) across the multiple VxLAN networks, the processor core mapping manager 312 is configured to remap the sharing of the processor cores mapped to process the VxLAN packets with corresponding PMD based on a topology of the series of VMs (see, e.g., the SFC 510 of FIG. 5). The processor core mapping manager 312 is additionally configured to change the number of PMDs to increase or decrease the number of processor cores assigned to the virtual switch of the compute node 102 (e.g., the virtual switch 316).

Figure 5:
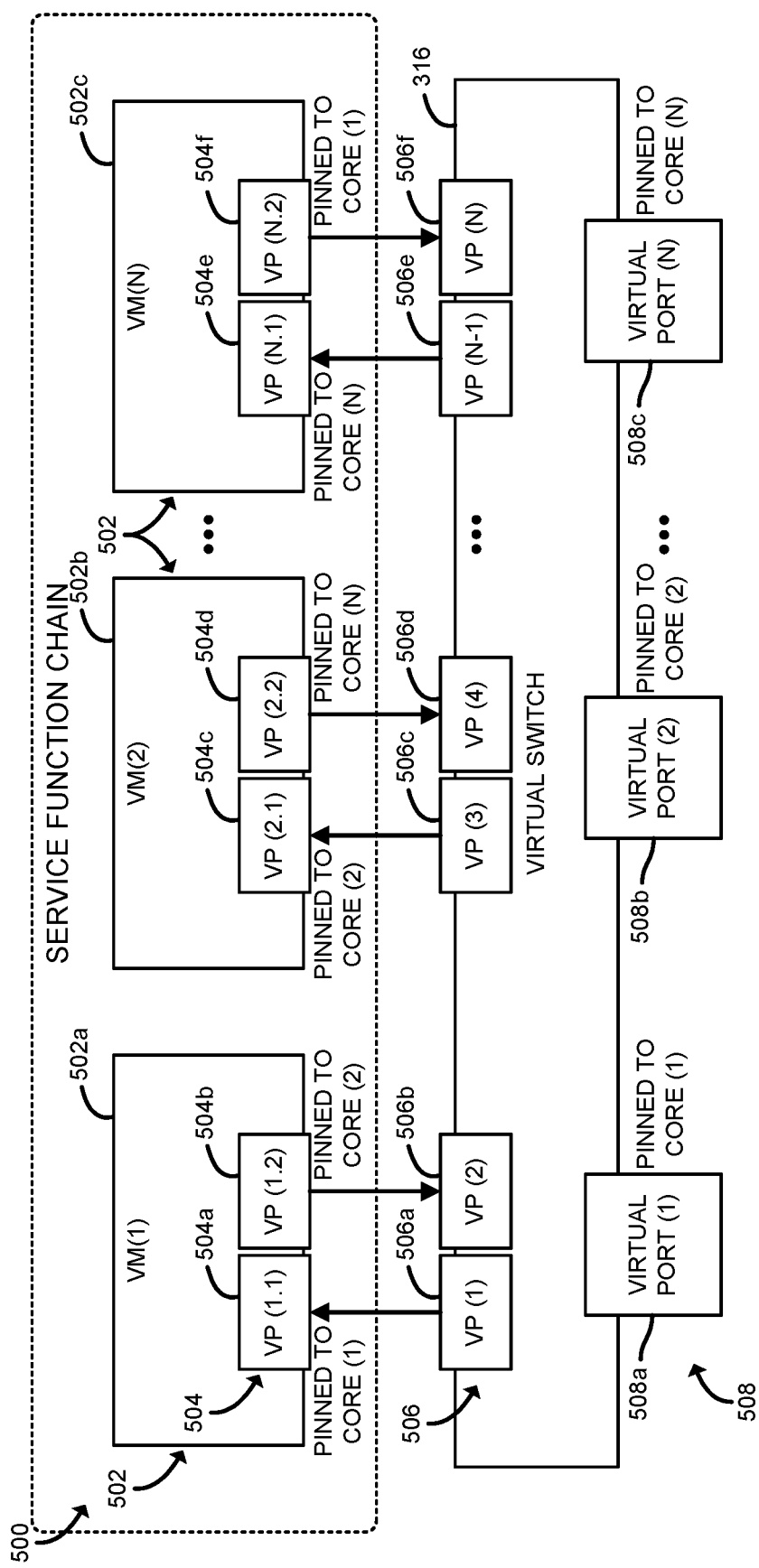
FIG. 5 is a simplified block diagram of at least one embodiment of a service function chain for performing processing operations that may be established by the compute node of FIGS. 1 and 2.

The virtual machine manager 314, which may be embodied as hardware, firmware, software, virtualized hardware, emulated architecture, and/or a combination thereof as discussed above, is configured to create and run virtual machines (VMs) (see, e.g., the VMs 502 of FIG. 5). To do so, the virtual machine manager 314 is configured to present a virtual operating platform to guest operating systems and manage the execution of the guest operating systems on the VMs. As such, multiple instances of a variety of operating systems may share the virtualized hardware resources of the compute node 102. It should be appreciated that the compute node 102 is commonly referred to as a "host" machine with "host" physical resources and each VM is commonly referred to as a "guest" machine with access to virtualized physical/hardware resources of the "host" machine. In some embodiments, information associated with the VMs may be stored in the VM data 304.

The virtual switch 316 may be embodied as any type of virtualized switch capable of managing the internal data transfer of network traffic related information, such as by directing communications from virtualized applications, virtualized network functions (VNFs), virtual machines (VMs), containers, etc., to the NIC 212, and vice versa. Additionally, the virtual switch 316 is configured to facilitate the communications between VMs, containers, etc. It should be appreciated that the virtual switch 316 is configured to intelligently direct such communications, such as by checking at least a portion of a network packet before moving the network packet to a destination, providing a layer of security, etc., rather than simply just forwarding the network traffic.

Figure 4:
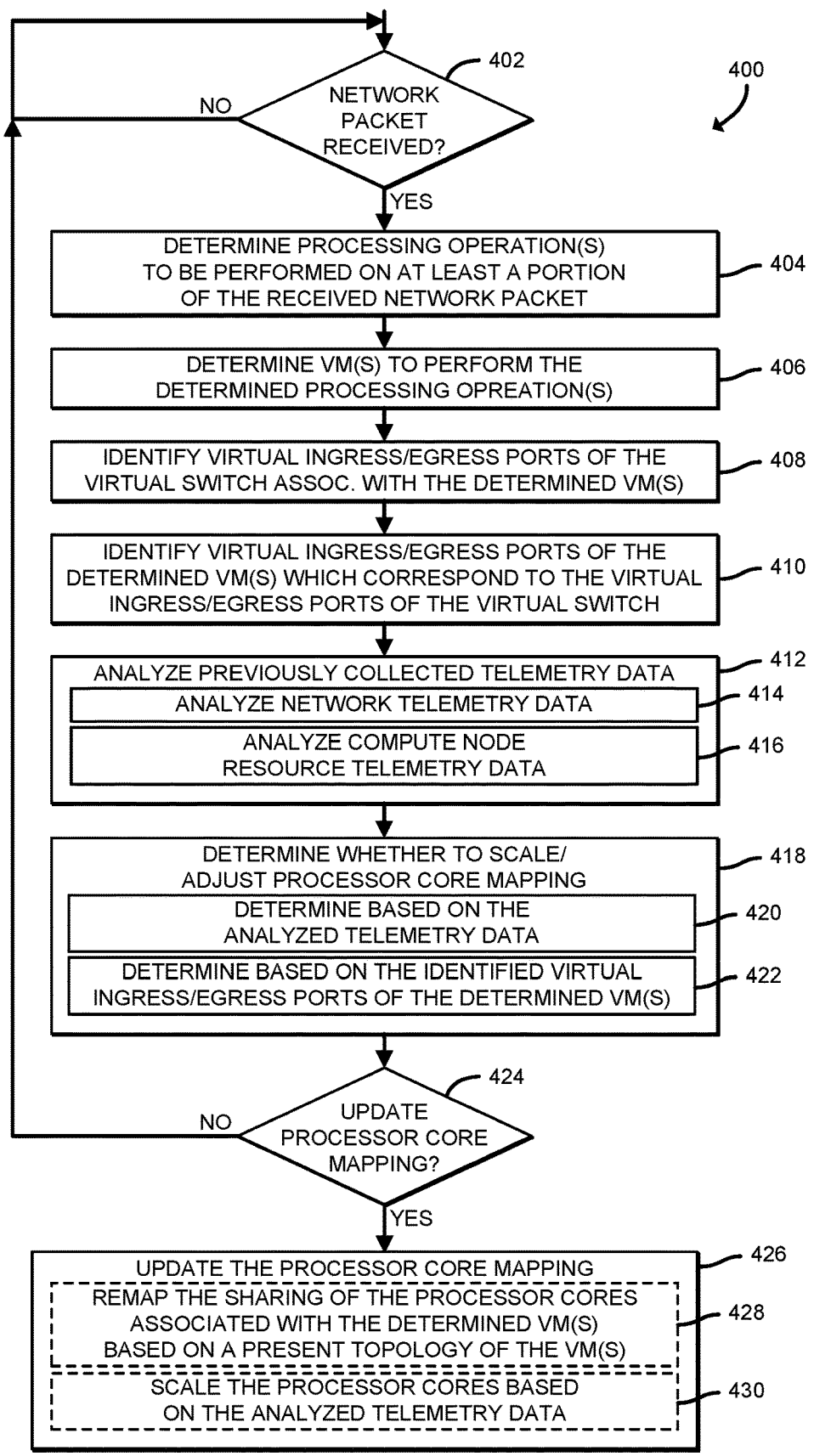
FIG. 4 is a simplified flow diagram of at least one embodiment of a method for adaptive platform resource assignment that may be performed by the compute node of FIGS. 1 and 2.

Referring now to FIG. 4, the compute node 102, in operation, may execute a method 400 for adaptive platform resource assignment. The method 400 begins in block 402, in which the compute node 102, or more particularly a NIC (e.g., the NIC 212 of FIG. 2) of the compute node 102 determines whether a network packet has been received. It should be appreciated that the network packet may have been received from a remote compute node (e.g., the source compute node 102a of FIG. 1) for processing at the compute node 102 or has been generated by the compute node 102 for transmission to another compute node 102 (e.g., the destination compute node 102b of FIG. 1). If the NIC 212 determines that a network packet has been received, the method 400 proceeds to block 404.

In block 404, the compute node 102 determines which processing operations are to be performed on at least a portion of the received network packet, such as may be based on a policy associated with a characteristic of the network packet (e.g., flow type, workload type, source identifying information, destination identifying information, etc.). In block 406, the compute node 102 determines which VMs are to perform the determined processing operations. In block 408, the compute node 102, or more particularly a virtual switch (e.g., the virtual switch 316 of FIG. 3) of the compute node 102, identifies the virtual ingress/egress ports of the virtual switch 316 that communicatively couple the determined VMs to the virtual ports of the virtual switch 316. In block 410, the virtual switch 316 identifies the virtual ingress/egress ports of the determined VMs that communicatively couple the identified virtual ports of the virtual switch 316 to the identified virtual ingress/egress ports of the determined VMs.

In block 412, the compute node 102 analyzes (e.g., by the performance monitor 310 of FIG. 3) previously collected telemetry data. For example, in block 414, the compute node 102 analyzes the network telemetry data to determine one or more network traffic characteristics (e.g., network traffic patterns, an amount of dropped network packets, a network traffic volume, network traffic workload types, network traffic distribution metrics, etc.). Additionally, in block 416, the compute node 102 analyzes compute node resource telemetry data to determine one or more performance metrics of the compute node 102, such as hardware resource utilization rates, virtual switch network traffic management characteristics, etc.

In block 418, the compute node 102, or more particularly, a processor core mapping manager (e.g., the processor core mapping manager 312 of FIG. 3) determines whether to scale or otherwise adjust a present mapping between the determined VMs and the processor cores pinned to, or otherwise associated with based on a predetermined processor core affinity, the respective ingress and egress virtual ports of the determined VMs (e.g., the processor core mapping). In block 420, the processor core mapping manager 312 determines whether to scale or otherwise adjust the present processor core mapping based on a result of the analyzed telemetry data. Additionally or alternatively, in block 422, the processor core mapping manager 312 determines whether to scale or otherwise adjust the present processor core mapping based on the identified virtual ingress/egress ports of the determined VMs, or more particularly the processor cores pinned to the respective identified virtual ingress/egress ports of the determined VMs.

In block 424, the processor core mapping manager 312 determines whether the processor core mapping is to be updated based on a result of the determination analysis performed in block 418. If not, the method 400 returns to block 402 to determine whether another network packet has been received; otherwise, the method 400 advances to block 426. In block 426, the processor core mapping manager 312 updates the processor core mapping, such as by adding or changing policies associated with processing operations of the VMFs/service function chain to which the received network packet corresponds. To do so, in block 428, the processor core mapping manager 312 may remap the sharing of the processor cores associated with the determined VMs based on a present topology of the VMs (see, e.g., the illustrative optimal configuration of VMs in the service function chain 500 of FIG. 5). Additionally or alternatively, in block 430, the processor core mapping manager 312 may scale the processor cores based on the analyzed telemetry data, as well as any applicable heuristics.

While illustratively described herein as the processor core mapping manager 312 being local to the compute node 102, it should be appreciated that, in other embodiments, the functionality as described herein as being performed by the processor core mapping manager 312 may be performed at a remote compute device, such as an SDN controller in SDN architectures. Accordingly, in such embodiments, it should be appreciated that the results of the telemetry data analysis (e.g., as described herein as being performed by the performance monitor 310 of FIG. 3) may be forwarded to the remote compute device. Alternatively, in other embodiments, the telemetry data may be transmitted to the remote compute device for analysis.

Referring now to FIG. 5, an illustrative service function chain 500 managed by the compute node 102 during operation that is communicatively coupled to the virtual switch 316 of FIG. 3. The service function chain 500 includes a series of VMs 502 for performing various processing operations, such as the network functions described previously. The illustrative VMs 502 include a first VM 502 designated as VM (1) 502*a*, a second VM 502 designated as VM (2) 502*b*, and a third VM 502 designated as VM (N) 502*c* (e.g., wherein the VM (N) 502*c* is the "Nth" VM 502 and "N" is a positive integer). As illustratively shown, each of the VMs includes two virtual ports 504, each of which provides either an ingress capability or an egress capability. As also illustratively shown, the virtual switch 316 includes multiple virtual ports 506, each of which similarly provides either an ingress capability or an egress capability.

The illustrative virtual ports 504 of the VM (1) 502*a* include an ingress virtual port 504 designated as virtual port (1.1) 504*a* and an egress virtual port 504 designated as virtual port (1.2) 504*b*, each of which are respectively communicatively coupled to a first virtual port 506 of the virtual switch 316 designated as virtual port (1) 506*a* and a second virtual port 506 designated as virtual port (2) 506*b*. Similarly, the illustrative virtual ports 504 of the VM (2) 502*b* include an ingress virtual port 504 designated as virtual port (2.1) 504*c* and an egress virtual port 504 designated as virtual port (2.2) 504*d*, each of which are respectively communicatively coupled to a third virtual port 506 of the virtual switch 316 designated as virtual port (3) 506*c* and a fourth virtual port 506 designated as virtual port (4) 506*d*. The illustrative virtual ports 504 of the VM (N) 502*c* include an ingress virtual port 504 designated as virtual port (N.1) 504*e* and an egress virtual port 504 designated as virtual port (N.2) 504*f* (e.g., wherein the "N" represents the "Nth" VM 502 as described above), each of which are respectively communicatively coupled to a fifth virtual port 506 of the virtual switch 316 designated as virtual port (N−1) 506*e* and a sixth virtual port 506 designated as virtual port (N) 506*f* (e.g., wherein "N" is the "Nth" virtual port 506 and "N" is a positive integer).

The virtual switch 316 additionally includes virtual ports 508, each of which support both ingress and egress capability and, while not illustratively shown, are communicatively coupled to a NIC (e.g., the NIC 212 of FIG. 2) of the compute node 102. The illustrative virtual ports 508 of the virtual switch 316 include a first virtual port 508 designated as virtual port (1) 508*a*, a second virtual port 508 designated as virtual point (2) 508*b*, and a third virtual port 508 designated as virtual point (N) 508*c* (e.g., wherein the virtual point (N) 508*c* is the "Nth" virtual port 508 and "N" is a positive integer).

It should be appreciated that the illustrative embodiment of FIG. 5 represents a preferred processor core sharing configuration (e.g., as a result of the processor core mapping relative to alternative configurations in which the ingress/egress VMs are pinned to different processor cores), as denoted by the reference to which processor core (e.g., the processor cores 202 of FIG. 2) each of the virtual ports 504 is pinned to, such that the first ingress virtual port 504*a* of the service function chain 500 and the last egress virtual port 504*f* of the service function chain 500 are pinned to the same processor core, and are the only virtual ports 504 participating in north-south traffic in and out of the compute node 102 (e.g., via virtual port (1) 508*a*). For example, as illustratively shown, the ingress virtual port 504 of the VM (1) 502*a* (i.e., virtual port (1.1) 504*a*) and the egress virtual port 504 of the VM (N) 502*c* (i.e., virtual port (N.2) 504*f*) are both pinned to processor core (1) (e.g., the processor core (1) 202*a* of FIG. 2).

Additionally, it should be further appreciated that in the optimal processor core sharing configuration, each egress virtual port 504 is pinned to the same process core as the ingress virtual port 504 of the subsequent VM 502 in the service function chain 500. In other words, the east-west network traffic (i.e., internal traffic) between VMs 502 is forwarded/received by those virtual ports 504 that are pinned to the same processor core. For example, as illustratively shown, the egress virtual port 504 of VM (1) 502*a* (i.e., virtual port (1.2) 504*b*) and the ingress virtual port 504 of VM (2) 502*b* (i.e., virtual port (2.1) 504*c*) are both pinned to processor core (2) (e.g., the processor core (2) 202*b* of FIG. 2).

In an illustrative embodiment in which a network packet is received by the NIC (e.g., the NIC 212 of FIG. 2), the NIC 212 stores at least a portion of the data associated with the received network packet and passes a reference (e.g., a pointer to the location in memory in which the data has been stored) to a virtual port 508 of the virtual switch 316, such as the first virtual port (1) 508*a*. The reference is then passed to the virtual port (1) 506*a*, which in turn is forwarded to the ingress virtual port (1.1) 504*a* for processing of the data by the VM (1) 502*a*. Upon completion of processing of the data, the reference may then be passed to the next VM (2) in the service function chain 500, illustratively shown as the VM (2) 502*b*. As also illustratively shown, the egress virtual port (1.2) 504*b* of the VM (1) 502*a* and the ingress virtual port (2.1) 504*c* of the VM (2) 502*b* are pinned to the same processor core (e.g., the processor core (2) 202*b* of FIG. 2). Similarly, each of the ingress virtual ports 504 for the subsequent VMs 502 in the service function chain 500 are pinned to the same processor core 202 as the egress virtual port 504 of the preceding VM 502. Finally, the last egress virtual port (N.2) 504*f* is illustratively shown as being pinned to the same processor core 502 (e.g., the process core 202*a* of FIG. 2) as the virtual port 508 (e.g., the virtual port 508*a*) that is pinned to the same processor core 502 as the ingress the virtual port 508 of the virtual switch 316.

EXAMPLES

Illustrative examples of the technologies disclosed herein are provided below. An embodiment of the technologies may include any one or more, and any combination of, the examples described below.

Example 1 includes a compute node for adaptive platform resource management, the compute node comprising processor core mapping management circuitry to configure a processor core mapping scheme for a plurality of virtual machines (VMs) that are (i) managed by the compute node and (ii) communicatively coupled to a virtual switch managed by the compute node, wherein the plurality of VMs includes at least a first VM and a second VM, wherein the first VM includes (i) a first ingress virtual port that is pinned to a first processor core of a plurality of processor cores of a processor of the compute node and (ii) a first egress virtual port that is pinned to a second processor core of the plurality of processor cores, and wherein the second VM includes (i) a second ingress virtual port that is pinned to the second processor core and (ii) a second egress virtual port that is pinned to the first processor core.

Example 2 includes the subject matter of Example 1, and wherein the first ingress virtual port of the first VM is to receive a reference of a received network packet from a network interface controller (NIC) of the compute node via a virtual port of the virtual switch that is pinned to the first processor core, and wherein the second egress port of the second VM is to transmit the reference of the received network packet to the NIC via the virtual port of the virtual switch.

Example 3 includes the subject matter of any of Examples 1 and 2, and wherein the first egress virtual port of the first VM is to transmit the reference of the received network packet to the second VM via the virtual switch, and wherein the second ingress port of the second VM is to receive the reference of the received network packet from the virtual switch.

Example 4 includes the subject matter of any of Examples 1-3, and wherein to configure the processor core mapping scheme comprises to update the processor core mapping scheme to remap sharing of at least a portion of the plurality of processor cores based on a topology of the plurality of VMs.

Example 5 includes the subject matter of any of Examples 1-4, and further including performing monitoring circuitry to analyze telemetry data of the compute node; and configure the processor core mapping scheme based on a result of the analyzed telemetry data, wherein to analyze the telemetry data comprises to analyze network telemetry data and resource telemetry data.

Example 6 includes the subject matter of any of Examples 1-5, and wherein to configure the processor core mapping scheme comprises to add or remove one or more of the plurality of processor cores pinned to at least one of the plurality of VMs based on a result of the analysis of the telemetry data.

Example 7 includes the subject matter of any of Examples 1-6, and wherein to analyze the network telemetry data comprises to analyze the network telemetry data to determine one or more network traffic characteristics, and wherein the network traffic characteristics include at least one of a network traffic pattern, an amount of dropped network packets, a network traffic volume, a network traffic workload type, and a network traffic distribution across the plurality of VMs.

Example 8 includes the subject matter of any of Examples 1-7, and wherein to analyze the resource telemetry data comprises to analyze the resource telemetry data to determine one or more performance metrics of the compute node, wherein the one or more performance metrics include a processor core utilization rate, a memory utilization rate, and a virtual switch network traffic management characteristic.

Example 9 includes one or more machine-readable storage media comprising a plurality of instructions stored thereon that, in response to being executed, cause a compute node to configure a processor core mapping scheme for a plurality of virtual machines (VMs) that are (i) managed by the compute node and (ii) communicatively coupled to a virtual switch managed by the compute node, wherein the plurality of VMs includes at least a first VM and a second VM, wherein the first VM includes (i) a first ingress virtual port that is pinned to a first processor core of a plurality of processor cores of a processor of the compute node and (ii) a first egress virtual port that is pinned to a second processor core of the plurality of processor cores, and wherein the second VM includes (i) a second ingress virtual port that is pinned to the second processor core and (ii) a second egress virtual port that is pinned to the first processor core.

Example 10 includes the subject matter of Example 9, and wherein the first ingress virtual port of the first VM is to receive a reference of a received network packet from a network interface controller (NIC) of the compute node via a virtual port of the virtual switch that is pinned to the first processor core, and wherein the second egress port of the second VM is to transmit the reference of the received network packet to the NIC via the virtual port of the virtual switch.

Example 11 includes the subject matter of any of Examples 9 and 10, and wherein the first egress virtual port of the first VM is to transmit the reference of the received network packet to the second VM via the virtual switch, and wherein the second ingress port of the second VM is to receive the reference of the received network packet from the virtual switch.

Example 12 includes the subject matter of any of Examples 9-11, and wherein to configure the processor core mapping scheme comprises to update the processor core mapping scheme to remap sharing of at least a portion of the plurality of processor cores based on a topology of the plurality of VMs.

Example 13 includes the subject matter of any of Examples 9-12, and wherein the plurality of instructions further cause the compute node to analyze telemetry data of the compute node; and configure the processor core mapping scheme based on a result of the analyzed telemetry data, wherein to analyze the telemetry data comprises to analyze network telemetry data and resource telemetry data.

Example 14 includes the subject matter of any of Examples 9-13, and wherein to configure the processor core mapping scheme comprises to add or remove one or more of the plurality of processor cores pinned to at least one of the plurality of VMs based on a result of the analysis of the telemetry data.

Example 15 includes the subject matter of any of Examples 9-14, and wherein to analyze the network telemetry data comprises to analyze the network telemetry data to determine one or more network traffic characteristics, and wherein the network traffic characteristics include at least one of a network traffic pattern, an amount of dropped network packets, a network traffic volume, a network traffic workload type, and a network traffic distribution across the plurality of VMs.

Example 16 includes the subject matter of any of Examples 9-15, and wherein to analyze the resource telemetry data comprises to analyze the resource telemetry data to determine one or more performance metrics of the compute node, wherein the one or more performance metrics include a processor core utilization rate, a memory utilization rate, and a virtual switch network traffic management characteristic.

Example 17 includes a method for adaptive platform resource management, the method comprising configuring, by a compute node, a processor core mapping scheme for a plurality of virtual machines (VMs) that are (i) managed by the compute node and (ii) communicatively coupled to a virtual switch managed by the compute node, wherein the plurality of VMs includes at least a first VM and a second VM, wherein the first VM includes (i) a first ingress virtual port that is pinned to a first processor core of a plurality of processor cores of a processor of the compute node and (ii) a first egress virtual port that is pinned to a second processor core of the plurality of processor cores, and wherein the second VM includes (i) a second ingress virtual port that is pinned to the second processor core and (ii) a second egress virtual port that is pinned to the first processor core.

Example 18 includes the subject matter of Example 17, and further including receiving, by the first ingress virtual port of the first VM, a reference of a received network packet from a network interface controller (NIC) of the compute node via a virtual port of the virtual switch that is pinned to the first processor core; and transmitting, by the second egress port of the second VM, the reference of the received network packet to the NIC via the virtual port of the virtual switch.

Example 19 includes the subject matter of any of Examples 17 and 18, and further including transmitting, by the first egress virtual port of the first VM, the reference of the received network packet to the second VM via the virtual switch; and receiving, by the second ingress port of the second VM, the reference of the received network packet from the virtual switch.

Example 20 includes the subject matter of any of Examples 17-19, and wherein configuring the processor core mapping scheme comprises updating the processor core mapping scheme to remap sharing of at least a portion of the plurality of processor cores based on a topology of the plurality of VMs.

Example 21 includes the subject matter of any of Examples 17-20, and further including analyzing telemetry data of the compute node; and configuring the processor core mapping scheme based on a result of the analyzed telemetry data, wherein analyzing the telemetry data comprises analyzing network telemetry data and resource telemetry data.

Example 22 includes the subject matter of any of Examples 17-21, and wherein configuring the processor core mapping scheme comprises adding or removing one or more of the plurality of processor cores pinned to at least one of the plurality of VMs based on a result of the analysis of the telemetry data.

Example 23 includes the subject matter of any of Examples 17-22, and wherein analyzing the network telemetry data comprises analyzing the network telemetry data to determine one or more network traffic characteristics, and wherein the network traffic characteristics include at least one of a network traffic pattern, an amount of dropped network packets, a network traffic volume, a network traffic workload type, and a network traffic distribution across the plurality of VMs.

Example 24 includes the subject matter of any of Examples 17-23, and wherein analyzing the resource telemetry data comprises analyzing the resource telemetry data to determine one or more performance metrics of the compute node, wherein the one or more performance metrics include a processor core utilization rate, a memory utilization rate, and a virtual switch network traffic management characteristic.

The invention claimed is:

1. A compute node comprising:
a processor; and
circuitry to implement a processor core mapping scheme for ingress and egress virtual ports of a plurality of virtual machines (VMs) coupled to a virtual switch and for at least one poll mode driver port coupled to the virtual switch, wherein to implement the processor core mapping scheme includes the circuitry to:
pin a first core of the processor to (i) an ingress virtual port of a first VM, (ii) an egress virtual port of a second VM and (iii) a poll mode driver port; and
pin a second core of the processor to (i) an egress virtual port of the first VM and (ii) an ingress virtual port of the second VM.

2. The compute node of claim 1, wherein the ingress virtual port of the first VM is to receive a reference of a received network packet from a network interface controller (NIC) of the compute node via the poll mode driver port, and wherein the egress virtual port of the second VM is to transmit the reference of the received network packet to the NIC via the poll mode driver port.

3. The compute node of claim 2, wherein the egress virtual port of the first VM is to transmit the reference of the received network packet to the second VM via the virtual switch, and wherein the ingress virtual port of the second VM is to receive the reference of the received network packet from the virtual switch.

4. The compute node of claim 1, wherein to implement the processor core mapping scheme comprises the circuitry to update the processor core mapping scheme to cause the first or second core of the processor to be pinned to a different VM from among the plurality of VMs based on a change in a topology of the plurality of VMs.

5. The compute node of claim 1, further comprising the circuitry to:
analyze telemetry data of the compute node; and
implement the processor core mapping scheme based on a result of the analyzed telemetry data,
wherein to analyze the telemetry data comprises to analyze network telemetry data and resource telemetry data.

6. The compute node of claim 5, wherein to implement the processor core mapping scheme comprises the circuitry to cause the first or second core of the processor to be pinned to a different VM from among the plurality of VMs based on a result of the analysis of the telemetry data.

7. The compute node of claim 5, wherein to analyze the network telemetry data comprises to analyze the network telemetry data to determine one or more network traffic characteristics, and wherein the network traffic characteristics include at least one of a network traffic pattern, an amount of dropped network packets, a network traffic volume, a network traffic workload type, and a network traffic distribution across the plurality of VMs.

8. The compute node of claim 5, wherein to analyze the resource telemetry data comprises to analyze the resource telemetry data to determine one or more performance metrics of the compute node, wherein the one or more performance metrics include a processor core utilization rate, a memory utilization rate, and a virtual switch network traffic management characteristic.

9. One or more non-transitory machine-readable storage media comprising a plurality of instructions stored thereon that, in response to being executed, cause circuitry of a compute node to:
implement a processor core mapping scheme for ingress and egress virtual ports of a plurality of virtual machines (VMs) coupled to a virtual switch and for at least one poll mode driver port coupled to the virtual switch, wherein to implement the processor core mapping scheme includes the instructions to cause the circuitry to: pin a first core of a processor to (i) an ingress virtual port of a first VM, (ii) an egress virtual port of a second VM and (iii) a poll mode driver port; and
pin a second core of the processor to (i) an egress virtual port of the first VM and (ii) an ingress virtual port of the second VM.

10. The one or more non-transitory machine-readable storage media of claim 9, wherein the ingress virtual port of the first VM is to receive a reference of a received network packet from a network interface controller (NIC) of the compute node via the poll mode driver port, and wherein the egress virtual port of the second VM is to transmit the reference of the received network packet to the NIC via the poll mode driver port.

11. The one or more non-transitory machine-readable storage media of claim 10, wherein the egress virtual port of the first VM is to transmit the reference of the received network packet to the second VM via the virtual switch, and wherein the ingress virtual port of the second VM is to receive the reference of the received network packet from the virtual switch.

12. The one or more non-transitory machine-readable storage media of claim 9, wherein to implement the processor core mapping scheme comprises the circuitry to update the processor core mapping scheme to cause the first or second core of the processor to be pinned to a different VM from among the plurality of VMs based on a change in a topology of the plurality of VMs.

13. The one or more non-transitory machine-readable storage media of claim 9, wherein the plurality of instructions to further cause the circuitry to:
analyze telemetry data of the compute node; and
implement the processor core mapping scheme based on a result of the analyzed telemetry data,
wherein to analyze the telemetry data comprises to analyze network telemetry data and resource telemetry data.

14. The one or more non-transitory machine-readable storage media of claim 13, wherein to implement the processor core mapping scheme comprises to cause the first or second core of the processor to be pinned to a different VM from among the plurality of VMs based on a result of the analysis of the telemetry data.

15. The one or more non-transitory machine-readable storage media of claim 13, wherein to analyze the network telemetry data comprises to analyze the network telemetry data to determine one or more network traffic characteristics, and wherein the network traffic characteristics include at least one of a network traffic pattern, an amount of dropped network packets, a network traffic volume, a network traffic workload type, and a network traffic distribution across the plurality of VMs.

16. The one or more non-transitory machine-readable storage media of claim 13, wherein to analyze the resource telemetry data comprises to analyze the resource telemetry data to determine one or more performance metrics of the compute node, wherein the one or more performance metrics include a processor core utilization rate, a memory utilization rate, and a virtual switch network traffic management characteristic.

17. A method comprising:
implementing, by circuitry of a compute node, a processor core mapping scheme for ingress and egress virtual ports of a plurality of virtual machines (VMs) coupled to a virtual switch and for at least one poll mode driver port coupled to the virtual switch, wherein implementing the processor core mapping scheme includes:
pinning a first core of a processor to (i) an ingress virtual port of a first VM, (ii) an egress virtual port of a second VM and (iii) a poll mode driver port; and
pinning a second core of the processor to an egress virtual port of the first VM and an ingress virtual port of the second VM.

18. The method of claim 17, wherein the ingress virtual port of the first VM is to receive a reference of a received network packet from a network interface controller (NIC) of the compute node via the poll mode driver port, and wherein the egress virtual port of the second VM is to transmit the reference of the received network packet to the NIC via the poll mode driver port.

19. The method of claim 18, wherein the egress virtual port of the first VM is to transmit the reference of the received network packet to the second VM via the virtual switch, and wherein the ingress virtual port of the second VM is to receive the reference of the received network packet from the virtual switch.

20. The method of claim 17, wherein implementing the processor core mapping scheme comprises updating the processor core mapping scheme to cause the first or second core of the processor to be pinned to a different VM from among the plurality of VMs based on a change in a topology of the plurality of VMs.

21. The method of claim 17, further comprising:
analyzing telemetry data of the compute node; and
implementing the processor core mapping scheme based on a result of the analyzed telemetry data,
wherein analyzing the telemetry data comprises analyzing network telemetry data and resource telemetry data.

22. The method of claim 21, wherein implementing the processor core mapping scheme comprises causing the first or second core of the processor to be pinned to a different VM from among the plurality of VMs based on a result of the analysis of the telemetry data.

23. The method of claim 21, wherein analyzing the network telemetry data comprises analyzing the network telemetry data to determine one or more network traffic characteristics, and wherein the network traffic characteristics include at least one of a network traffic pattern, an amount of dropped network packets, a network traffic volume, a network traffic workload type, and a network traffic distribution across the plurality of VMs.

24. The method of claim 21, wherein analyzing the resource telemetry data comprises analyzing the resource telemetry data to determine one or more performance metrics of the compute node, wherein the one or more performance metrics include a processor core utilization rate, a memory utilization rate, and a virtual switch network traffic management characteristic.

* * * * *